(12) United States Patent
Jones et al.

(10) Patent No.: US 8,797,925 B2
(45) Date of Patent: *Aug. 5, 2014

(54) METHOD, BASE STATION AND MOBILE STATION FOR TDD OPERATION IN A COMMUNICATION SYSTEM

(71) Applicant: Sony Corporation, Tokyo (JP)

(72) Inventors: William John Jones, Chippenham (GB); Joseph Chung Shing Cheung, Santa Clara, CA (US); Alan Edward Jones, Wiltshire (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,546

(22) Filed: Oct. 1, 2013

(65) Prior Publication Data

US 2014/0029488 A1    Jan. 30, 2014

Related U.S. Application Data

(63) Continuation of application No. 12/979,560, filed on Dec. 28, 2010, which is a continuation of application No. 10/544,451, filed as application No. PCT/GB2004/000526 on Feb. 11, 2004, now Pat. No. 7,890,113.

(30) Foreign Application Priority Data

Feb. 11, 2003  (GB) .................................. 0303079.8

(51) Int. Cl.
*H04J 3/00*    (2006.01)
*H04B 7/26*    (2006.01)
*H04W 16/04*    (2009.01)
*H04J 4/00*    (2006.01)
*H04L 5/14*    (2006.01)
*H04B 7/00*    (2006.01)
*H04W 16/06*    (2009.01)

(52) U.S. Cl.
CPC ...... *H04J 4/00* (2013.01); *H04W 16/06* (2013.01); *H04B 7/2643* (2013.01); *H04L 5/1438* (2013.01); *H04W 16/04* (2013.01)
USPC ........................... 370/280; 370/294; 370/310

(58) Field of Classification Search
USPC ................................ 370/280, 294, 310–338
See application file for complete search history.

(56) References Cited

U.S. PATENT DOCUMENTS

| | | |
|---|---|---|
| 6,847,622 B1 | 1/2005 | Emmons, Jr. et al. |
| 6,859,655 B2 | 2/2005 | Struhsaker |

(Continued)

FOREIGN PATENT DOCUMENTS

| | | |
|---|---|---|
| EP | 1259092 A2 | 11/2002 |
| GB | 2398455 A | 8/2004 |

(Continued)

OTHER PUBLICATIONS

Haas, H. et al. (Sep. 8-11, 1998) "Outage probability of CDMA-TDD micro cells in a CDMA-FDD environment," The Ninth IEEE Symposium on Personal, Indoor and Mobile Radio Communications, Boston, MA.

(Continued)

*Primary Examiner* — Xavier Wong
(74) *Attorney, Agent, or Firm* — Oblon, Spivak, McClelland, Maier & Neustadt, L.L.P.

(57) ABSTRACT

A method, NodeB and User Equipment for TDD operation in a communication system operating in TDD mode in a frequency band allocated for FDD operation. Preferably, operation is in TDD uplink and downlink mode in a first frequency band designated or normally used for FDD uplink communication, and in TDD downlink-only mode in a second frequency band designated or normally used for FDD downlink communication. The invention provides the following advantages: Provides a flexible method to deploy a time division duplex architecture in frequency division duplex spectrum. Allows flexible use of system capacity by adjusting the uplink and downlink capacity split. Removes previous FDD duplex restrictions.

20 Claims, 3 Drawing Sheets

(56) References Cited

U.S. PATENT DOCUMENTS

| | | | |
|---|---|---|---|
| 7,239,621 | B2 | 7/2007 | Eriksson et al. |
| 7,502,596 | B2 | 3/2009 | Takao et al. |
| 7,890,113 | B2 * | 2/2011 | Jones et al. .................. 455/447 |
| 2002/0071480 | A1 | 6/2002 | Marjelund et al. |
| 2002/0089957 | A1 | 7/2002 | Viero |
| 2002/0098821 | A1 | 7/2002 | Struhsaker |
| 2006/0098592 | A1 * | 5/2006 | Proctor, Jr. et al. ........... 370/315 |
| 2011/0090826 | A1 * | 4/2011 | Jones et al. .................. 370/281 |

FOREIGN PATENT DOCUMENTS

| | | |
|---|---|---|
| JP | 2002-521988 | 7/2002 |
| JP | 2011-024255 | 2/2011 |
| JP | 2011-024256 | 2/2011 |
| JP | 2011-041303 | 2/2011 |
| KR | 2001-0074747 | 8/2001 |
| WO | WO-98/32236 | 6/1998 |
| WO | WO-00/07399 | 2/2000 |
| WO | WO-00/42800 A1 | 7/2000 |
| WO | WO-02058270 A2 | 7/2002 |

OTHER PUBLICATIONS

"3$^{rd}$ Generation Partnesrship Project; Technical Specification Group Radio Acess Network; Utran Overall Description (Release 6)." (Sep. 2005) 3GPP:Valbonne France TS 25.401 v6.7.0:1-48.

"3$^{rd}$ Generation Partnership Project: Technical Specification Group Services and System Aspects; General Packet Radio Service (GPRS); Service description: Stage 2 (Release 6)" (Mar. 2006). 3GPP: Valbonne, France, TS 23.060 v6. 12.0:1-212.

Great Britain Search Report mailed Sep. 2, 2003 for Great Britain Application No. 0303079.8 filed Feb. 11, 2003, 3 pages.

International Search Report and Written Opinion mailed Jun. 4, 2004, for PCT Application No. PCT/GF2004/000526 filed on Feb. 2, 2004, 14 pages.

Kim. D. H. et al. (May 2001). "Capacity Analysis of TDD Cell Sharing Underutilized FDD Uplink,"IEEE 53$^{rd}$ Vehicular Technology Conference 4:3044-3048.

Povey, G. J. R. et al. (Oct. 1997). "TDD-CDMA Extension to FDD-CDMA Based Third Generation Cellular System," IEEE 6$^{th}$ International Conference on Universal personal communications Record 2:813-817.

Wong, W. et al. (Jun. 1999). "Frequency Selection Strategies for Hybrid TDD/FDD-CDMA Cellular Networks," IEEE International Conference on Communications 2:1152-1156.

"3$^{rd}$ Generation Partnership Project: Technical Specification Group Radio Access Network; Physical Channels and Mapping of Transport Channels onto Physical Channels (TDD) (Release 7)," (Mar. 2006). 3GPP: Valbonne, France, TS 25.221 V7.0.0:1-139.

Great Britain Search Report mailed Sep. 3, 2003 for Great Britain Application No. 0312186.0.3 pages.

International Search Report mailed Sep. 1, 2004, for PCT Application No. PCT/GB2004/002307 filed on May 28, 2004, 3 pages.

Korean Office Action issued Apr. 13, 2011, in Patent Application No. 10-2010-7028593.

U.S. Appl. No. 14/043,472, filed Oct. 1, 2013, Jones, et al.

U.S. Appl. No. 14/043,570, filed Oct. 1, 2013, Jones, et al.

Japanese Office Action issued Aug. 13, 2013, in Japan Patent Application No. 2010-215114.

Luiz Magalhaes, et al., "Transport Level Mechanisms for Bandwidth Aggregation on Mobile Hosts", Network Portocols, 2001, Ninth International Conference on Nov. 11-14, 2001, pp. 165-171.

Japanese Office Action issued Jan. 28, 2014 in Japan Patent Application No. 2013-143483.

Korean Office Action issued Mar. 21, 2014 in Korea Patent Application No. 10-2013-7008554.

\* cited by examiner

METHOD, BASE STATION AND MOBILE STATION FOR TDD OPERATION IN A COMMUNICATION SYSTEM

CROSS REFERENCE TO RELATED APPLICATIONS

This application is a Continuation of and is based upon and claims the benefit of priority under 35 U.S.C. §120 for U.S. Ser. No. 12/979,560 filed Dec. 28, 2010 which is a continuation of U.S. Ser. No. 10/544,451 filed Jun. 16, 2006, the entire contents of each are incorporated herein by reference. U.S. Ser. No. 10/544,451 is a National Stage of PCT/GB2004/000526, filed Feb. 11, 2004, and claims the benefit of priority under 35 U.S.C. §119 from United Kingdom Patent Application No. 0303079.8, filed Feb. 11, 2003.

FIELD OF THE INVENTION

This invention relates to communication systems and particularly Time Division Duplex (TDD) operation in cellular communication systems.

BACKGROUND OF THE INVENTION

In the field of this invention it is known that first and second generation cellular standards all use "Frequency Division Duplex" (FDD) in which there are separate downlink (base station to mobile) and uplink (mobile to base station) frequency allocations. These allocations are separated by a "duplex spacing" to prevent interference between the simultaneous transmission and reception taking place at both the base station and mobile. FDD allocations are typically termed "paired spectrum".

"Time Division Duplex" (TDD) is used in more recent standards, such as "$3^{rd}$ Generation Partnership Project" (3GPP) "Time Division-Code Division Multiple Access" (TD-CDMA) and 3GPP "Time Division-Synchronous Code Division Multiple Access" (TD-SCDMA). In TDD systems, transmission and reception takes place alternately in time on the same frequency. TDD is very well suited for packet data communication where uplink and downlink capacity can easily be adjusted to meet subscriber traffic profile.

TDD is not used in FDD bands, because of interference concerns. TDD can operate in the mobile transmit (uplink) portion of a FDD band without detrimental interference. The allocation of TDD channels immediately adjacent to the FDD uplink channels in the "International Mobile Telecommunications 2000" (IMT-2000, International Telecommunication Union designated '3G' band) provides evidence of the feasibility of this. The frequency allocation for IMT-2000 is shown in FIG. 1.

However, operation of TDD in the downlink portion of an FDD band is problematic, because of adjacent channel interference from existing FDD base stations to the receivers of co-located or nearby TDD base stations, both of which typically transmit at higher power than the corresponding user terminals.

Consequently, where a wireless operator has an FDD spectrum allocation, TDD technology can normally only be operated in the FDD uplink part of the spectrum, leaving the FDD downlink spectrum unutilized and effectively 'wasted'.

A need therefore exists for an arrangement, method and unit for TDD operation in a communication system wherein the abovementioned disadvantage (s) may be alleviated.

STATEMENT OF INVENTION

In accordance with a first aspect of the present invention there is provided a method for TDD operation in a communication system as claimed in claim 1.

In accordance with a second aspect of the present invention there is provided a base station for TDD operation in a communication system as claimed in claim 8.

In accordance with a third aspect of the present invention there is provided a mobile station for TDD operation in a communication system as claimed in claim 15.

BRIEF DESCRIPTION OF THE DRAWINGS

One method, base station and mobile station for TDD operation in a communication system incorporating the present invention will now be described, by way of example only, with reference to the accompanying drawings, in which.

DESCRIPTION OF PREFERRED EMBODIMENT(S)

The present invention is based on the realization by the inventors that it is possible to:

Enable operation of TDD technology in a band allocated as paired spectrum for FDD Provide the ability to use the FDD downlink spectrum effectively to provide capacity and therefore avoid wastage. This is referred to as an auxiliary TDD downlink channel.

Avoid detrimental interference in operation of TDD in the FDD downlink spectrum.

Remove the fixed duplex frequency separation requirement.

Figure 1:
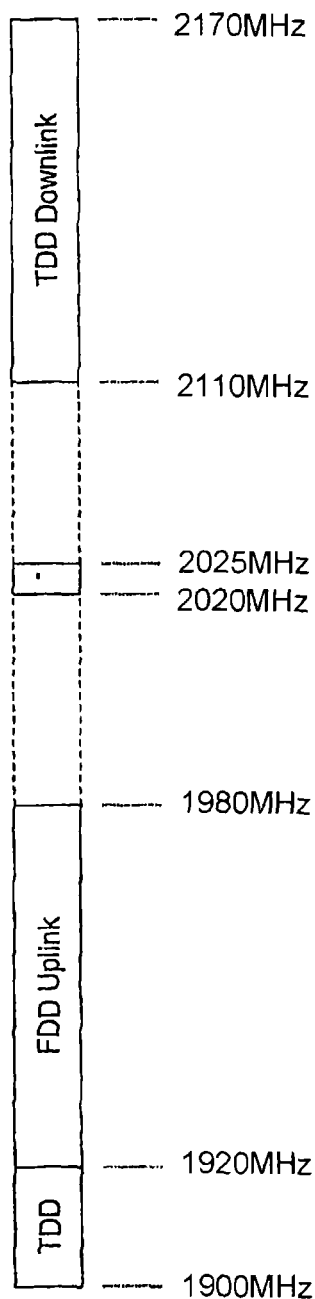
FIG. 1 shows a block schematic illustration of IMT-2000 frequency allocation.
Figure 2:
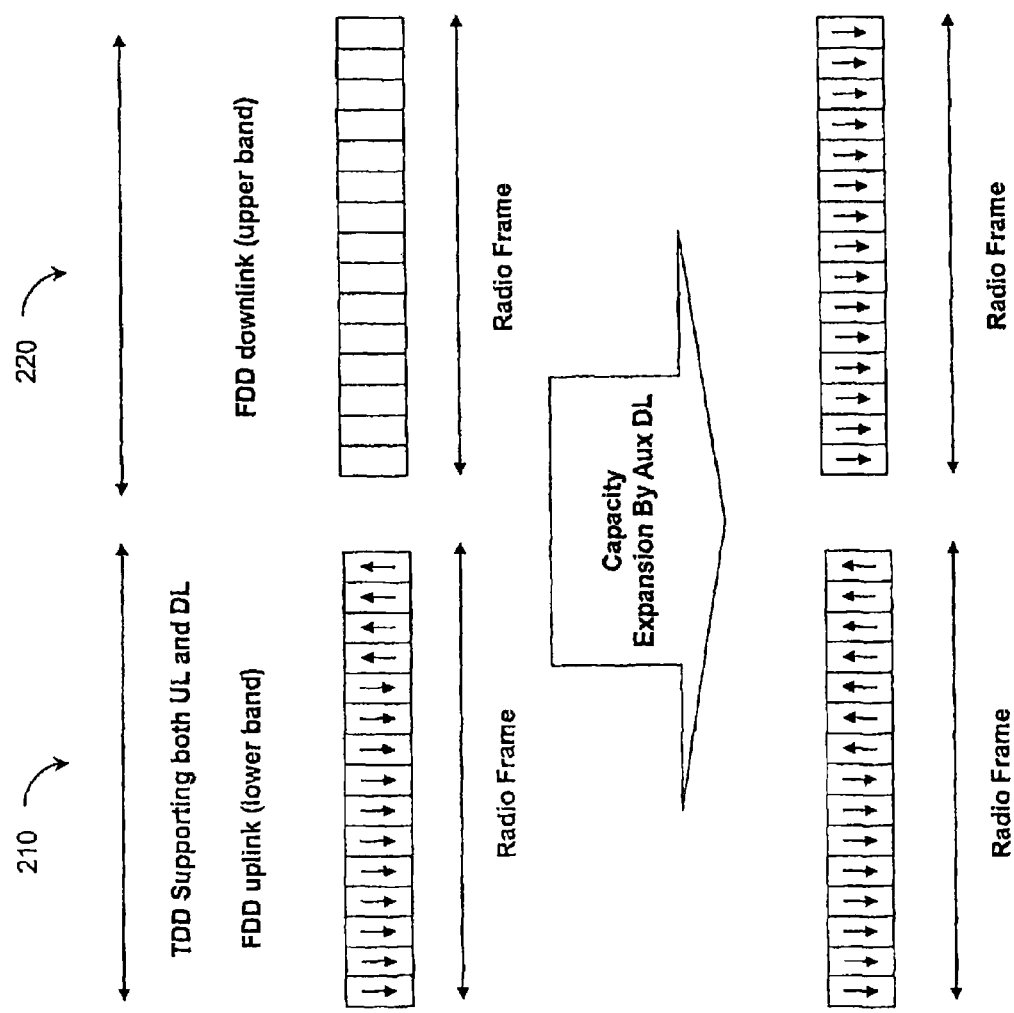
FIG. 2 shows a block schematic illustration of TDD with auxiliary downlink utilization.

An example of TDD operation with auxiliary downlink is shown in FIG. 2. As illustrated, standard TDD operates in the uplink FDD spectrum (210) while the auxiliary downlink operates in the downlink FDD spectrum (220). In the illustration, an example of a 15-time slot frame structure is shown. An upward pointing arrow in a radio frame denotes an uplink time slot, and a downward pointing arrow denotes a downlink time slot. As can be seen, system capacity is expanded by use of the auxiliary downlink.

Figure 3:
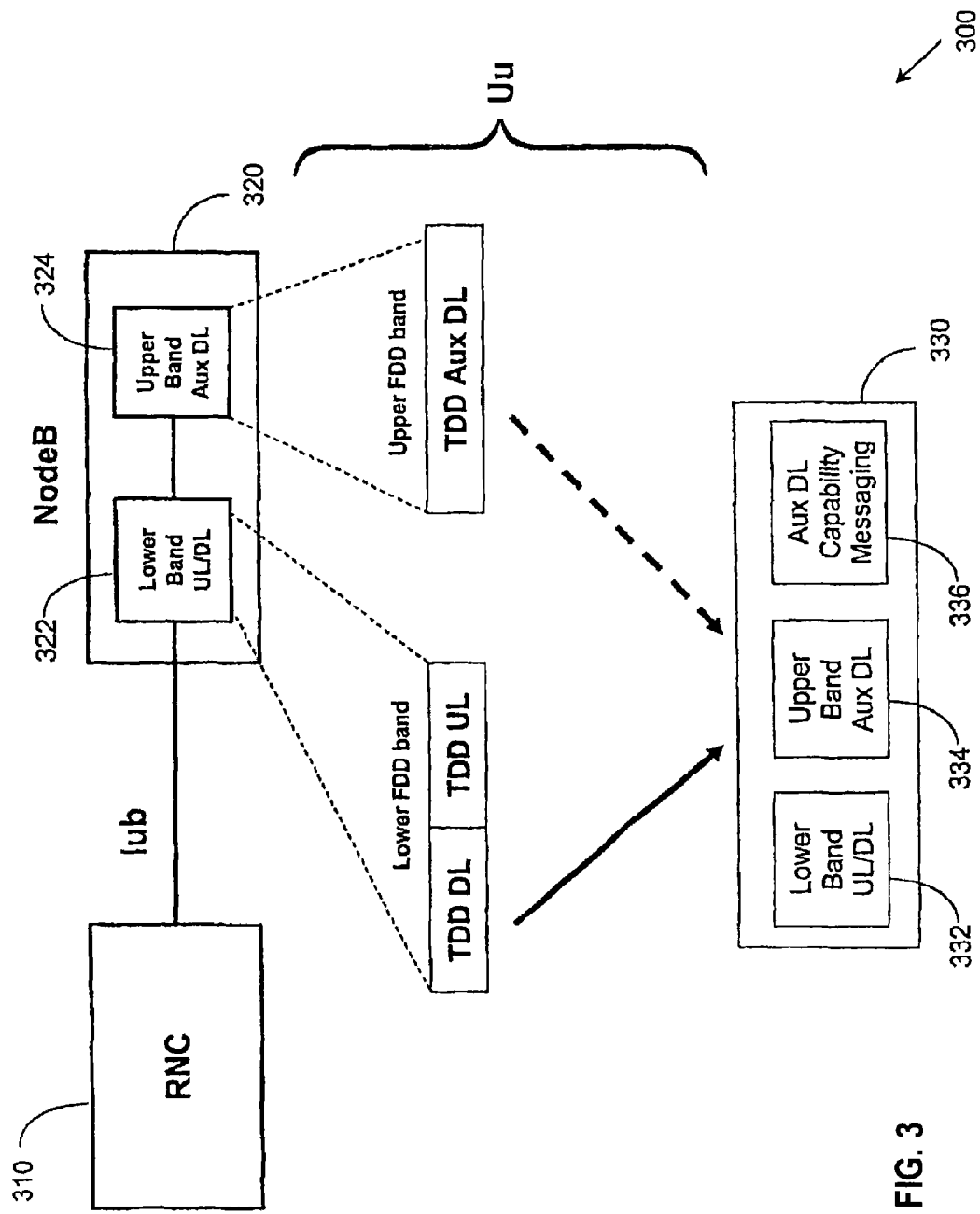
FIG. 3 shows a block schematic illustration of system architecture of TDD with auxiliary downlink.

FIG. 3 shows the basic architecture of a 3GPP cellular communication system 300 incorporating the present invention. As illustrated, a NodeB (or base station) 310 is controlled (over the 'Iub' interface) by a Radio Network Controller (RNC) 320 and communicates over the Uu radio interface with User Equipment (UE or mobile terminal) 330.

It will be understood that in other respects the system 300 operates in accordance with relevant 3GPP Technical Specifications (available at the website http://www.3gpp.org), and need not be described in further detail herein. However, as will be explained further below, for the NodeB 320 the following is to be noted that the base station (NodeB) includes a lower band logical unit 322 and an upper band logical unit 324 and operates in both the upper (FDD downlink) and lower (FDD uplink) bands simultaneously, under the control of the RNC 310.

The lower band logical unit 322 supports normal TDD operation, where the radio resource is divided into time slots.

The upper band logical unit 324 supports auxiliary downlink operation. This logical unit supports downlink operation only. The radio resource is divided into time slots.

In the system of FIG. 3, three types of UE 330 can be supported:

1. Single frequency standard TDD UE (not shown):
   This is the standard TDD UE where both uplink and downlink operate on a single frequency. This type of UE will operate by communicating with the lower band logical unit in the NodeB.
2. Single instantaneous frequency UE (not shown):
   This type of UE is able to tune to two different frequencies (the lower and upper FDD bands) in the same TDD frame under the control of the network. The UE operates uplink transmission in the lower FDD band. The UE can operate in either the standard TDD downlink (lower FDD band) or auxiliary downlink (upper FDD band) under the control of the network.
3. Dual simultaneous frequency UE 330:
   This type of UE has a lower band UL/DL logical unit 332, an upper 'Aux DL' logical unit 334 and an 'Aux DL' Capability Messaging logical unit 336, and is able to simultaneously tune to both the lower and upper FDD bands. The UE operates uplink transmission in the lower FDD band. The UE operates standard TDD downlink (lower FDD band) and auxiliary downlink (upper FDD band) under the control of the network. With dual simultaneous frequency capability the UE is able to operate with increased downlink capacity.

In operation of the system of FIG. 3, the auxiliary downlink ('Aux DL') capability allows an inherently TDD technology to efficiently utilize the FDD downlink band, avoiding wastage of spectrum, and the downlink resource in the lower and upper bands is treated as a combined 'single pool' resource, which can be allocated to users according to demand. The NodeB 320 provides common signalling for both TDD frequencies.

At any time, an individual UE that can support the 'Aux DL' mode of operation may be allocated downlink capacity in the lower band or upper band or both.

UE's and NodeB's exchange 'Aux DL' capability messages, such that the NodeB's and UE's with and without the 'Aux DL' feature can co-exist in the network and each operate to the best of their respective abilities.

A UE that does not support auxiliary downlink, e.g., a roaming UE from another TDD network, is compatible with the auxiliary downlink architecture by operating in standard TDD mode in lower band. In this case, the auxiliary downlink feature is transparent to the UE.

While the Auxiliary Downlink increases the total downlink capacity, it also enables uplink capacity to be increased, as additional timeslots can be allocated in the lower TDD band to uplink traffic channels.

The separation of the lower and upper band is not restricted by the standard FDD duplex frequency separation. The UE is instructed by the network to tune to the correct frequency for the auxiliary downlink. At the network level the auxiliary downlink in the upper band can even be adjacent to the lower band (even though the UE may be required to operate only on one downlink frequency at one time to minimize the receive filtering requirements). This effectively allows the operator to deploy the proposed TDD technology in contiguous frequency allocation.

It will be understood that the arrangement, method and unit for TDD operation in a communication system described above provides the following advantages:

Provides a flexible method to deploy a time division duplex architecture in frequency division duplex spectrum.

Allows flexible use of system capacity by adjusting the uplink and downlink capacity split.

Removes previous FDD duplex restrictions.

The invention claimed is:

1. An electronic device comprising:
   a first frequency receiving device configured to perform wireless communications in a first frequency channel;
   an additional frequency receiving device configured to perform wireless communications in a second frequency channel; and
   processing circuitry configured to
   transmit a capability message to a base station so as to enable the base station to use both the first frequency channel and the second frequency channel simultaneously, and
   communicate with the base station in both the first frequency channel and the second frequency channel simultaneously, so as to provide the electronic device with increased communications capacity compared to other electronic devices that are not capable of performing wireless communications in dual simultaneous channels.

2. The electronic device according to claim 1, wherein the processing circuitry is configured to use a common signaling protocol in the first frequency channel and the second frequency channel.

3. The electronic device according to claim 1, wherein the first frequency channel has a wider bandwidth than the second frequency channel.

4. The electronic device according to claim 1, wherein the first frequency channel has a narrower bandwidth than the second frequency channel.

5. The electronic device according to claim 1, wherein the processing circuitry is configured to receive an instruction from a base station to perform frequency tuning for the second frequency channel.

6. An electronic device comprising:
   a first frequency receiving device configured to perform wireless communications in a first frequency channel;
   an additional frequency receiving device configured to perform wireless communications in a second frequency channel; and
   processing circuitry configured to
   receive a capability message from a user equipment so as to enable the electronic device to use both the first frequency channel and the second frequency channel simultaneously, and
   communicate with the user equipment in both the first frequency channel and the second frequency channel simultaneously, so as to provide the electronic device with increased communications capacity compared to other electronic devices that are not capable of performing wireless communications in dual simultaneous channels.

7. The electronic device according to claim 6, wherein the processing circuitry is configured to use a common signaling protocol in the first frequency channel and the second frequency channel.

8. The electronic device according to claim 6, wherein the first frequency channel has a wider bandwidth than the second frequency channel.

9. The electronic device according to claim 6, wherein the first frequency channel has a narrower bandwidth than the second frequency channel.

10. The electronic device according to claim 1, wherein the processing circuitry is configured to transmit an instruction to a base station to perform frequency tuning for the second frequency channel.

11. An electronic device comprising:
   at least one antenna that supports wireless communications;
   a first frequency receiving device configured to perform wireless communications in a first frequency channel;
   an additional frequency receiving device configured to perform wireless communications in a second frequency channel; and
   processing circuitry configured to
   transmit a capability message to a base station so as to enable the base station
   to use both the first frequency channel and the second frequency channel simultaneously, and
   communicate with the base station in both the first frequency channel and the
   second frequency channel simultaneously, so as to provide the electronic device with increased communications capacity compared to other electronic devices that are not capable of performing wireless communications in dual simultaneous channels.

12. The electronic device according to claim 11, wherein the processing circuitry is configured to use a common signaling protocol in the first frequency channel and the second frequency channel.

13. The electronic device according to claim 11, wherein the first frequency channel has a wider bandwidth than the second frequency channel.

14. The electronic device according to claim 11, wherein the first frequency channel has a narrower bandwidth than the second frequency channel.

15. The electronic device according to claim 11, wherein the processing circuitry is configured to receive an instruction from a base station to perform frequency tuning for the second frequency channel.

16. An electronic device comprising:
   at least one antenna that supports wireless communications;
   a first frequency receiving device configured to perform wireless communications in a first frequency channel;
   an additional frequency receiving device configured to perform wireless communications in a second frequency channel; and
   processing circuitry configured to
   receive a capability message from a user equipment so as to enable the electronic device to use both the first frequency channel and the second frequency channel simultaneously, and
   communicate with the user equipment in both the first frequency channel and the second frequency channel simultaneously, so as to provide the electronic device with increased communications capacity compared to other electronic devices that are not capable of performing wireless communications in dual simultaneous channels.

17. The electronic device according to claim 16, wherein the processing circuitry is configured to use a common signaling protocol in the first frequency channel and the second frequency channel.

18. The electronic device according to claim 16, wherein the first frequency channel has a wider bandwidth than the second frequency channel.

19. The electronic device according to claim 16, wherein the first frequency channel has a narrower bandwidth than the second frequency channel.

20. The electronic device according to claim 16, wherein the processing circuitry is configured to transmit an instruction to a base station to perform frequency tuning for the second frequency channel.

* * * * *